United States Patent [19]

Ohmori et al.

[11] 3,928,497

[45] Dec. 23, 1975

[54] PROCESS FOR PREPARING GRAFT-MODIFIED ETHYLENE PLYOMER OR COPOLYMER

[75] Inventors: Masahiko Ohmori, Iwakuni; Toshiharu Tomatsu, Ohtake; Tadao Iwata, Iwakuni, all of Japan

[73] Assignee: Mitsui Petrochemical Industries, Ltd., Tokyo, Japan

[22] Filed: Apr. 26, 1974

[21] Appl. No.: 464,296

[30] Foreign Application Priority Data
May 1, 1973  Japan.............................. 48-47588

[52] U.S. Cl...... 260/878 R; 260/897 A; 260/78.4 D
[51] Int. Cl.$^2$.................... C08L 23/26; C08L 23/04
[58] Field of Search..................... 260/78.4 D, 878 R

[56] References Cited
UNITED STATES PATENTS
2,973,344   2/1961   Fasce............................ 260/78.4 D
FOREIGN PATENTS OR APPLICATIONS
885,969   1/1958   United Kingdom

OTHER PUBLICATIONS

Porejko, S. et al., "Grafting of Maleic Anhydride or Polyethylene," Journal of Polymer Science, PtA-1, Vol. 7, 1647-1656, (1969).

*Primary Examiner*—Joseph L. Schofer
*Assistant Examiner*—Maria S. Tungol
*Attorney, Agent, or Firm*—Sherman & Shalloway

[57] ABSTRACT

A process for preparing a graft-modified ethylene polymer or copolymer which comprises reacting an ethylene polymer or copolymer with a dicarboxylic acid graft-copolymerizable therewith or its graft-copolymerizable derivative in an alkyl-substituted aromatic hydrocarbon solvent in the presence of a radical initiator, characterized in that the reaction is performed while adding the dicarboxylic acid or its derivative gradually to the solvent in which the starting ethylene polymer or copolymer is present.

11 Claims, No Drawings

PROCESS FOR PREPARING GRAFT-MODIFIED ETHYLENE PLYOMER OR COPOLYMER

This invention relates to a process for preparing a graft-modified ethylene polymer or copolymer having improved melt-bondability and shapability, especially melt-boundability to nylon resins and laminate-shapability with nylon resins.

More specifically, it relates to a process for preparing a graft-modified ethylene polymer or copolymer which comprises reacting an ethylene polymer or copolymer with a dicarboxylic acid graft-copolymerizable therewith or its graft-copolymerizable derivative in an alkyl-substituted aromatic hydrocarbon solvent in the presence of a radical initiator, characterized in that the reaction is performed while adding the dicarboxylic acid or its derivative gradually, preferably at a rate of not more than $10^{-2}$ mol/hour per gram of the starting polymer or copolymer, to the solvent in which the starting ethylene polymer or copolymer is present.

Graft-modified resins have already been known which are obtained by grafting maleic acid, maleic anhydride, or a maleic acid ester, etc. to an olefin polymer or copolymer such as polyethylene, an ethylene copolymer, or polypropylene in an attempt to improve its adhesiveness. These conventional graft-modified resins, however, are unsatisfactory in that they do not exhibit sufficient shapability in forming a laminate with nylon by melt-bonding, or do not exhibit sufficient bond strength.

For example, Japanese Patent Publication No. 15422/69 published on July 9, 1969 discloses a process for preparing modified polypropylene with a high degree of polymerization and a good conversion of maleic anhydride, which comprises reacting polypropylene with maleic anhydride in an alkyl-substituted aromatic hydrocarbon solvent such as xylene while adding a peroxide such as benzoyl peroxide as a radical initiator. This patent discloses that the addition of the radical initiator to the solvent containing the polypropylene and the maleic anhydride should be effected after the maleic acid has distributed around the particles of the polypropylene in the solvent, and therefore, good results are obtained only when the reaction is performed by gradually adding the radical initiator after maleic anhydride has been dissolved in a mixture of the polypropylene and the solvent, and the result is poor when the maleic anhydride and the radical initiator are added simultaneously.

Japanese Patent Publication No. 6384/64 (published on May 4, 1964) discloses a method for preparing modified polyethylene or ethylene copolymer, which involves melt-kneading an ethylene polymer or copolymer with, for example, maleic anhydride in the absence of a solvent and a catalyst at an elevated temperature. This melting method, however, requires the use of high temperatures such as 225° to 250°C., and a cross-linking reaction of the ethylene polymer or copolymer with itself occurs to a large extent, resulting in a drastic decrease in its melt index. Accordingly, it is impossible to obtain a graft-modified ethylene polymer or copolymer having high bond strength as contemplated in this invention.

We have made investigations about the graft-modification of an ethylene polymer or copolymer by the solvent modifying method, and found that when a dicarboxylic acid such as maleic anhydride or its derivative is added gradually to a mixture consisting of a solvent and a starting ethylene polymer or copolymer, there can be obtained a graft-modified ethylene polymer or copolymer having superior melt-bondability and shapability. We have also discovered that according to this process, the sequence of adding a radical initiator and the rate of its addition are not at all restricted, but the radical initiator can be added to the reaction system from the outset, or simultaneously with the dicarboxylic acid or its derivative. Further investigation led to the discovery that when the reaction is carried out by adding dropwise the radical initiator to the reaction system in which the polymer or copolymer and the dicarboxylic acid or its derivative are present in advance, or when the polymer or copolymer, the dicarboxylic acid or its derivative and the radical initiator are fed together and reacted, or when the melting method is employed, the improvement intended by the present invention cannot be achieved. This will be shown later by Comparative Examples.

Accordingly, an object of this invention is to provide a process for preparing a graft-modified ethylene polymer or copolymer having improved melt-bondability and shapability, especially improved melt-bondability to nylon resins and laminate-shapability with nylon resins.

Many other objects and advantages of this invention will become apparent from the following description.

According to this invention, the graft-copolymerizable dicarboxylic acid or its derivative is gradually added to the reaction system comprising the alkyl-substituted hydrocarbon solvent and the starting ethylene polymer or copolymer to graft the dicarboxylic acid or its derivative to the polymer. The radical initiator can be added to the reaction system prior to the initiation of the reaction, or a part or whole of it can be added separately at any desired rate simultaneously with the dicarboxylic acid or its derivative.

The alkyl-substituted aromatic hydrocarbon solvent used in this invention has at least one alkyl group in its aromatic ring, is liquid under the reaction conditions, and can dissolve the starting polyethylene or an ethylene copolymer, dicarboxylic acid or its derivative, and the radical initiators. The alkyl group may be of straight chain or branched chain. Examples of such a solvent include toluene, xylene, a mixture of isomers of xylene, trimethylbenzenes, tetramethylbenzenes, ethyl benzene, cumene, and cymene. Of these, toluene, xylene, mixed xylene, ethyl benzene, and mixtures of these are preferred. When the reaction is carried out using an aliphatic solvent such as hexane, heptane or kerosene, or an alkyl-nonsubstitued aromatic hydrocarbon such as benzene or chlorobenzene, a graft-modified polyethylene having high bond strength of, for examples more than 2 Kg/inch cannot be obtained. Modified polyethylenes produced in such an alkyl-nonsubstituted aromatic hydrocarbon solvent such as chlorobenzene are difficult to fabricate, and blends of these modified polyethylenes with polyethylene do not exhibit high bond strength and are unsatisfactory in many applications, because of insufficient compatibility between them.

The ethylene copolymer used as a starting material in the present invention is a copolymer of ethylene with other olefins such as propylene, 1-butene, 1-hexene and butadiene. Usually, the copolymers that are utilized in this invention have at least 50 mol% of units derived from ethylene. The various properties, such as rigidity, density or crystallinity, of these copolymers can be varied according to a combination of their molecular weight, the type and content of the copolymer components, the polymerization catalyst and the polymerization conditions such as pressure. Furthermore, the modifying process of this invention can be applied to any ethylene polymer or copolymers.

Examples of the dicarboxylic acid or its derivative which is graft-copolymerizable with the starting ethylene polymer or copolymer are maleic acid, its anhydride, or its monoester such as a lower alkyl monoester which are the most frequently used species, and also include fumaric acid, mesaconic acid, citraconic acid, 5-norbornene-2,3-dicarboxylic acid, 1,2,3,6-tetrahydrophthalic acid, or anhydrides thereof, or monoesters thereof. These dicarboxylic acids or the derivatives thereof can be used either alone or in admixture of two or more.

The radical initiators that can be used in this invention are any conventional radical initiators, such as organic peroxides and azonitriles. Examples of the organic peroxide are alkyl peroxides such as diisopropyl peroxide, ditert.butyl peroxide and tert. butyl hydroperoxide; aryl peroxides such as dicumyl peroxide and cumyl hydroperoxide; acyl peroxides such as dilauryol peroxide; ketone peroxides such as methyl ethyl ketone peroxide and cyclohexanone peroxide; peroxy carbonates; and peroxy carboxylates. Examples of the azonitriles are azobisbutyronitrile and azobisisopropionitrile.

In the process of this invention, the dicarboxylic acid or its derivative is gradually added to the reaction system comprising the alkyl-substitued aromatic hydrocarbon solvent and the starting ethylene polymer or copolymer present therein. Preferably, it is added at a rate of not more than $10^{-2}$ mol/hour, preferably $10^{-5}$ mol/hour to $10^{-2}$ mol/hour, per gram of the starting polymer or copolymer. More preferably, the rate of addition is $10^{-5}$ mol/hour to $10^{-3}$ mol/hour per gram of the starting polymer or copolymer.

In the case of polypropylene, only the graft ratio of the dicarboxylic acid or its derivative should be taken into consideration since it does not undergo a cross-linking reaction in the presence of a radical initiator. However, because the ethylene polymer or copolymer used in this invention tends to be cross-linked, it is necessary to consider not only the grafting ratio, but also the degree of cross-linking occurring incident to the grafting reaction. In order to avoid an undesirable decrease in the melt-index of the polymer by cross-linking, the rate of addition of not more than $10^{-2}$ mol/hour gives good results. If the rate of addition is more than $10^{-2}$ mol/hour, there is a tendency that when the resulting graft-modified ethylene polymer or copolymer is used as a blend with unmodified polyethylene, the blend does not exhibit sufficiently high bond strength. On the other hand, if the rate of addition is less than $10^{-5}$ mol/hour, long periods of time are required to graft the desired amount of the dicarboxylic acid or its derivative. It is preferred therefore to add it gradually at a rate within the range specified above.

According to one example of the process of this invention, the dicarboxylic acid or its derivative is fed at the feed rate specified above into the reaction system consisting of 1000 parts by volume of the alkyl-substituted aromatic hydrocarbon solvent, 10 to 300 parts by weight of polyethylene and 0.005 to 5 parts by weight of a radical initiator. Also, a part or whole of the radical initiator may be added together with the above dicarboxylic acid or its derivative.

The reaction temperature is above the point at which the starting ethylene polymer or copolymer swells with, or dissolves in, the above solvent, and is higher so long as there is no appreciable cleavage of the molecular chain of polyethylene. This is advantageous because a high grafting ratio and the substantial freedom from the reduction of the melt index of the polymer can be achieved at higher temperatures.

The time period of feeding the dicarboxylic acid or its derivative can be optionally determined from the relation between the rate of feed and the total amount of feed, and is usually from 1 to 20 hours. Preferably, the reaction is carried out while maintaining the reaction system as homogeneous as possible by such means as stirring, and can be performed either batchwise or continuously.

The way of adding the radical initiator is optional, but in order to inhibit the occurrence of a cross-linking reaction and to minimize the consumption of the dicarboxylic acid or its derivative as a result of its homopolymerization, it is desirable to minimize its concentration in the reaction system. In actual operation, the dicarboxylic edicarboxylic acid or its derivative may be added continuously or intermittently as, for example, droplets of its solution.

The presence of the unreacted dicarboxylic acid or its derivative in an excessive amount in the reaction system may result in the formation of its homopolymer of low molecular weight. Therefore, irrespective of whether it is added continuously or intermittently, it is recommended to add it uniformly so that its amount will not become excessive at a certain time during its addition.

The amount of the dicarboxylic acid or its derivative is such that the proportion of units derived from the dicarboxylic acid or its derivative (the moles of the grafted dicarboxylic acid or its derivative) per gram of the resulting graft-modified ethylene polymer or copolymer is in the range of $10^{-7}$ to $10^{-3}$ mol. Usually, the amount of the above dicarboxylic acid or its derivative is about $2 \times 10^{-7}$ mol to about $1.5 \times 10^{-2}$ mol per gram of the starting ethylene polymer or copolymer.

Preferably, the graft-modified ethylene polymer or copolymer obtained by the process of this invention contains units derived from the dicarboxylic acid or its derivative in an amount of $10^{-7}$ to $10^{-3}$ mol, especially $5 \times 10^{-6}$ to $5 \times 10^{-4}$ mol, per gram of the polymer or copolymer.

After the reaction has been performed in the manner described above, the reaction mixture is cooled to room temperature, and a suitable precipitating agent, such as acetone, is added to precipitate the modified polyethylene. If desired, the precipitate is washed with a non-solvent such as a precipitating agent to remove inclusions such as the unreacted dicarboxylic acid or its derivative, or a homopolymer of the dicarboxylic acid or its derivative, to obtain the final product. If desired, the product is dried after washing.

Graft-modified ethylene polymers or copolymers having the most preferred shapability and bondability can be obtained when the reaction in accordance with the process of this invention is performed so as to satisfy the following equation:

$$\frac{\log MI_1 - \log MI_2}{A} \leq 2 \times 10^4$$

and $$0 \leq \log(MI_1/MI_2) \leq 2$$

wherein $MI_1$ is the melt index of the starting ethylene polymer or copolymer, $MI_2$ is the melt index of the resulting graft-modified ethylene polymer or copolymer, and A is the amount of units derived from the dicarboxylic acid or its derivative (the moles of the grafted dicarboxylic acid or its derivative) per gram of the graft-modified ethylene polymer or copolymer.

The amount of the dicarboxylic acid or its derivative grafted to the resulting grafted ethylene polymer or copolymer can be determined by known means.

The graft-modified ethylene polymer or copolymer obtained by the process of this invention can be advantageously used either as such or as a composition containing it and unmodified polyethylene. In order to exhibit sufficient melt-bond strength and maintain the desirable properties and processability of polyethylene, it is preferred to prepare a composition containing at least $10^{-7}$ mol, preferably at least $10^{-6}$ mol, of units derived from the dicarboxylic acid or its derivative, per gram of the composition. The modified polyethylene exhibits good adhesion not only to nylon resins, but also to polyamides in general. Furthermore, it exhibits good adhesion to metals such as aluminum, iron or steel.

The melt index of the polymer is determined by measuring the melt flow of the resin under a load of 2160 g at 190°C. for 10 minutes, and is expressed in g/10 min.

The following examples and Comparative Examples illustrate the present invention more specifically.

EXAMPLE 1

A 2-liter stainless steel pressure reactor equipped with a thermometer and a stirrer was charged with 1 liter of toluene and 100 g of polyethylene (Hizex, registered trademark of Mitsui Petrochemical Industries, Ltd., 1300 J, melt index 15), and then purged with nitrogen. After elevating the temperature to 125°C., a toluene solution of maleic anhydride (concentration of maleic anhydride 1 g/10 ml.) and a toluene solution of dicumyl peroxide (dicumyl peroxide concentration 0.15 g/10 ml.) were fed by means of pumps from separate pipes over a period of 4 hours. The rate of feeding maleic anhydride was $10^{-4}$ mol/hour.g-polyethylene. The total amount of maleic anhydride fed was 4.0 g, and that of dicumyl peroxide was 0.54 g. After the reaction, the reaction mixture was cooled to room temperature, and acetone was added. The precipitated grafted polyethylene was recovered by filtration, and repeatedly precipitated with acetone. The precipitate was dried at reduced pressure at an elevated temperature to form the graft-modified polyethylene in the form of a white powder. The resulting modified polyethylene was subjected to infrared absorption spectroscopy and neutralizing titration, and it was found that the content of maleic anhydride units was $1.11 \times 10^{-4}$ mol per gram of the modified polyethylene, and its melt index was 4.0.

5 Parts by weight of the resulting maleic anhydride-grafted polyethylene and 95 parts by weight of polyethylene (Hizex 5100 B, the registered trademark, Mitsui Petrochemical Industries, Ltd., melt index 0.2) were mixed and melted in an extruder, and fed into a die of a blow molding machine. On the other hand, nylon (Amylan CM 1011, the registered trademark, Toray Incorporated, melt viscosity $4 \times 10^3$ cps) was melted in a separate extruder, and fed to the same die maintained at 230°C. The die included two passages arranged concentrically. The polyethylene passed through the outer passage, and the nylon, through the inner passage. The outside diameter of the polyethylene layer was 80 mm and its thickness was 1 mm, whereas the nylon layer had an outside diameter of 78 mm and a thickness of 0.1 mm. The die lip had a diameter of 20 mm, and the outside diameter of the core was 14 mm. At a blow pressure of 6 Kg/cm²-g, a bottle having an inner capacity of 500 cc, an outside diameter of 80 mm and a height of 155 mm was molded. The bond strength between the polyethylene layer and the nylon layer of the bottle was tested by the peel test, and it was found that the bond strength was 3.0 Kg/inch.

EXAMPLE 2

A 2-liter glass reactor equipped with a thermometer, a stirrer and a dropping funnel was charged with 1 liter of p-xylene and 100 g of polyethylene (Hizex, 1300 J, the registered trademark, Mitsui Petrochemical Industries, Ltd., melt index 15), and purged with nitrogen. The temperature was elevated to 125°C., and with stirring, the polyethylene was completely dissolved. Then, a solution of 10 g of maleic anhydride in 30 ml. of p-xylene and a solution of 0.54 g of dicumyl peroxide in 30 ml. of p-xylene were added dropwise over a period of 4 hours through separate pipes, to perform a grafting reaction of the maleic anhydride with the polyethylene. The rate of feeding the maleic anhydride at this time was $2.5 \times 10^{-4}$ mol/hour per gram of the polyethylene. The resulting product was post-treated in the same way as in Example 1 to give a grafted polyethylene having a maleic anhydride unit content of $1.02 \times 10^{-4}$ mol per gram of the grafted polyethylene and a melt index of 5.1.

The resulting grafted polyethylene was molded together with nylon to form a multi-layered shaped article in the same way as in Example 1. The bond strength between the polyethylene layer and the nylon layer in the shaped article was 4.2 Kg/inch, showing a firm bonding.

COMPARATIVE EXAMPLE 1

In accordance with the procedure of Example 2, 10 g of maleic anydride and 0.54 g of dicumyl peroxide were together charged into the reaction system, and the grafting reaction was performed at 125°C. for 3.5 hours. There was obtained a graft-modified polyethylene having a maleic anhydride unit content of $1.03 \times 10^{-4}$ mol per gram of the grafted polyethylene and a melt index of 0.74.

The bond strength of the resulting grafted polyethylene was examined in the same way as in Example 1, and was found to be only 0.3 Kg/inch.

COMPARATIVE EXAMPLE 2

A 0.5-liter stainless steel autoclave equipped with a thermometer and a stirring rod was charged with 200 g of polyethylene (1300 J, melt index 15). After elevating the temperature to 200°C., 8.0 g of liquid maleic anhydride at 80°C. and 0.83 g of t-butyl cumyl peroxide were fed into the autoclave over a period of 4 hours. The rate of feeding the maleic anhydride was $10^{-4}$ mol/hour per gram of the polyethylene. The resulting modified polyethylene had a maleic anhydride unit content of $1.32 \times 10^{-4}$ mol/g and a melt index of not more than 0.1.

The bond strength of the grafted polyethylene was examined in the same way as in Example 1, and found to be 0.1 Kg/inch.

COMPARATIVE EXAMPLE 3

Example 2 was repeated except that after the temperature of the reaction system reached 125°C., all of the maleic anhydride was added, and only the dicumyl peroxide was gradually added over a period of 4 hours. The resulting modified polyethylene had a maleic anhydride unit content of $1.2 \times 10^{-4}$ mol per gram of the modified polyethylene and a melt index of 0.65, and exhibited a bond strength, measured in the same way as in Example 1, of 0.3 Kg/inch.

COMPARATIVE EXAMPLE 4

Example 1 was repeated except that chlorobenzene or benzene was used as the solvent. The resulting maleic anhydride-grafted polyethylene had a maleic anhydride unit content of $1.31 \times 10^{-4}$ mol/g or $1.25 \times 10^{-4}$ mol/g respectively. Each of the grafted polyethylenes had a melt index of as low as less than 0.01, and exhibited a bond strength, measured in the same way as in Example 1, of 0.1 Kg/inch.

EXAMPLES 3 AND 4

Example 2 was repeated except that the rate of feeding maleic anhydride was changed to $5 \times 10^{-5}$ mol/hour, and $10^{-3}$ mol/hour, respectively, per gram of the polyethylene, and the feeding period was changed to 20 hours and 1 hour, respectively. The results are shown in the following Table.

| Example | Maleic anhydride | | | Melt index | Bond strength (Kg/inch) |
|---|---|---|---|---|---|
| | Rate of feed/ hour/g of polyethylene | Feeding time (hours) | Content of maleic anhydride group(mol/g) | | |
| 3 | $5 \times 10^{-5}$ | 20 | $1.01 \times 10^{-4}$ | 7.2 | 5.5 |
| 4 | $10^{-3}$ | 1 | $0.07 \times 10^{-4}$ | 3.0 | 1.9 |

EXAMPLE 5

Example 2 was repeated except that mixed solvent composed of ethylbenzene, o-xylene, m-xylene and p-xylene (48:8:31:13 by weight percent) was used as the solvent. The resulting graft modified polyethylene had a maleic anhydride unit content of $1.05 \times 10^{-4}$ mol per gram of the grafted polyethylene and a melt index of 5.6. The bond strength of the grafted polyethylene, measured in the same was as in Example 1, was 4.5 Kg/inch.

EXAMPLE 6

Example 2 was repeated except that o-xylene was used as the solvent, 100 g of Neozex 45150 (registered trademark, Mitsui Petrochemical Industries, Ltd., melt index 15) was used as the polyethylene, 0.48 g of benzoyl peroxide was used as a radical initiator, and the total amount of maleic anhydride fed was changed to 20 g. There was obtained a meleic anhydride-grafted polyethylene having a melt index of 6.2 and a maleic anhydride group content of $1.08 \times 10^{-4}$ mol per gram of the grafted polyethylene. The bond strength of the grafted polyethylene, measured in the same way as in Example 1, was 2.9 Kg/inch.

EXAMPLE 7

Example 2 was repeated except that the same mixed xylene as used in Example 5 was employed as the solvent, Mirason M-68 (registered trademark, Mitsui Polychemical Co., Ltd., melt index 20) was used as the polyethylene, and the total amount of the maleic anhydride fed was changed to 20 g. There was obtained a maleic anhydride-grafted polyethylene having a maleic anhydride unit content of $1.41 \times 10^{-4}$ mol per gram of the grafted polyethylene and a melt index of 9.2.

A multi-layered shaped structure was produced in the same way as in Example 1 except that Mirason M-50 (registered trademark, Mitsui Polychemical Co., Ltd., melt index 1.9) was used as the unmodified polyethylene. There was obtained a multi-layered shaped structure in which the polyethylene layer firmly adhered to the nylon layer with a bond strength of 4.5 Kg/inch.

EXAMPLE 8

Example 1 was repeated except that the total amount of the ditert-butyl peroxide fed was changed to 0.30 g, and the reaction temperature was changed to 160°C. There was obtained a maleic anhydride-grafted polyethylene having a maleic anhydride unit content of $0.98 \times 10^{-4}$ mol/g of the graft polyethylene and a melt index of 8.2. When the resulting grafted polyethylene was molded in the same way as in Example 1, there was obtained a multi-layered shaped article in which the polyethylene layer adhered firmly to the nylon layer with a bond strength of 4.7 Kg/inch.

EXAMPLE 9

Example 2 was repeated except that 0.5 g of the maleic anhydride was used. There was obtained a grafted polyethylene having a maleic anhydride content of $5.2 \times 10^{-6}$ mol per gram of the grafted polyethylene and a melt index of 13.6.

50 Parts by weight of this grafted polyethylene was mixed with 50 parts by weight of Hezex 5100 B (registered trademark, Mitsui Petrochemical Industries, Ltd.) and the mixture was molded in the same way as in Example 1. There was obtained a multi-layered shaped article in which the polyethylene layer firmly adhered to the nylon layer with a bond strength of 3.5 Kg/inch.

EXAMPLE 10

Example 2 was repeated except that after the temperature of the reaction system reached 125°C., all of the dicumyl peroxide was added at a time, and only the maleic anhydride was added gradually over a period of 4 hours. There was obtained a grafted polyethylene having a maleic anhydride group content of $0.99 \times 10^{-4}$ mol per gram of the grafted polyethylene and a melting point of 7.2.

The resulting grafted polyethylene was molded in the same way as in Example 1, and there was obtained a multi-layered shaped article in which the polyethylene layer firmly bonded to the nylon layer with a bond strength of 4.8 Kg/inch.

EXAMPLE 11

Example 1 was repeated using 0.48 g of benzoyl peroxide or 0.33 g of azobisisobutyronitrile as the initiator, the resulting modified polyethylene had a maleic anhydride unit content of $0.92 \times 10^{-4}$ mol/g or $1.05 \times 10^{-4}$ mol/g, and a melt index of 5.2 or 4.4, respectively.

The modified polyethylene has a bond strength, measured in the same way as in Example 1, of 2.7 Kg/inch of 3.5 Kg/inch respectively.

What we claim is:

1. A process for preparing a graft-modified ethylene homopolymer or copolymer by the reaction of an ethylene homopolymer or copolymer with a dicarboxylic acid graft-copolymerizable therewith or its graft-copolymerizable derivative in the presence of a radical initiator comprising dissolving the ethylene homopolymer or copolymer in an alkyl-substituted aromatic solvent;

adding the dicarboxylic acid or its derivative to the solvent in which the ethylene homopolymer or copolymer is present at a rate of not more than $10^{-2}$ mol/hour per gram of starting ethylene polymer or copolymer; and, continuing the addition until the graft-modified ethylene homopolymer or copolymer contains from $10^{-7}$ to $10^{-3}$ mol of units derived from the dicarboxylic acid or its derivative, per gram of the homopolymer or copolymer.

2. The process of claim 1 wherein the rate of adding the dicarboxylic acid or its derivative is $10^{-5}$ mol/hour to $10^{-2}$ mol/hour per gram of the starting ethylene polymer or copolymer.

3. The process of claim 1 wherein said graft-modified ethylene polymer or copolymer has $5 \times 10^{-6}$ to $5 \times 10^{-4}$ mol of units derived from the dicarboxylic acid or its derivative per gram of the modified ethylene polymer or copolymer.

4. The process according to claim 1 in which the reaction is performed such that the following formulas are satisified $$\frac{\log MI_1 - \log MI_2}{A} \leq 2 \times 10^4$$

and $$0 \leq \log(MI_1/MI_2) \leq 2$$

wherein $MI_1$ is the melt index of the starting ethylene polymer or copolymer, $MI_2$ is the melt index of the resulting graft-modified ethylene polymer or copolymer, and A is the amount of units derived from the dicarboxylic acid or its derivative (the moles of the grafted dicarboxylic acid or its derivative) per gram of the graft-modified ethylene polymer or copolymer.

5. The process of claim 1 wherein the alkyl-substituted aromatic solvent is selected from at least one member of the group consisting of toluene, xylene, mixed xylene and ethyl benzene.

6. The process of claim 1 for preparing a graft-modified ethylene homopolymer.

7. The method of claim 1 for preparing a graft-modified ethylene copolymer wherein the copolymer contains at least 50 mol % of units derived from ethylene and a copolymerizable olefin selected from propylene, 1-butene, 1-hexene or butadiene.

8. The process of claim 1 wherein the dicarboxylic acid or its derivative is selected from the group consisting of maleic acid, fumaric acid, mesaconic acid, citraconic acid, 5-norbornene-2,3-dicarboxylic acid and 1,2,3,6-tetrahydrophthalic acid and the anhydrides and lower alkyl monoesters of these dicarboxylic acids.

9. The process of claim 1 wherein the radical initiator is added to the reaction system prior to the addition of the dicarboxylic acid or its derivative.

10. The process of claim 1 wherein at least part of the radical initiator is added to the reaction system with the dicarboxylic acid or its derivative.

11. The process of claim 1 wherein all of the radical initiator is added to the reaction system with the dicarboxylic acid or its derivative.

* * * * *